(12) United States Patent
Textor

(10) Patent No.: US 7,131,335 B2
(45) Date of Patent: Nov. 7, 2006

(54) PRESSURE SENSOR WITH BARRIER PROVIDING IMPENDING SENSOR FAILURE INDICATION

(75) Inventor: Olaf Textor, Schopfheim (DE)

(73) Assignee: Endress _ Hauser GmbH + Co. KG, Maulburg (DE)

( * ) Notice: Subject to any disclaimer, the term of this patent is extended or adjusted under 35 U.S.C. 154(b) by 12 days.

(21) Appl. No.: 10/481,404

(22) PCT Filed: Jun. 19, 2002

(86) PCT No.: PCT/EP02/06736

§ 371 (c)(1),
(2), (4) Date: Jun. 9, 2004

(87) PCT Pub. No.: WO03/002969

PCT Pub. Date: Jan. 9, 2003

(65) Prior Publication Data

US 2004/0234382 A1  Nov. 25, 2004

(30) Foreign Application Priority Data

Jun. 28, 2001  (DE) ................................ 101 31 405

(51) Int. Cl.
*G01L 7/08* (2006.01)
*G01L 7/18* (2006.01)
*G01L 9/12* (2006.01)
*G01L 19/12* (2006.01)
*G01L 19/18* (2006.01)

(52) U.S. Cl. ............................ 73/716; 73/715; 73/717; 73/718; 73/723; 73/724; 200/61.04

(58) Field of Classification Search ................ 73/86, 73/706, 715–728, 754; 200/61.04, 61.05; 342/71.1, 71.2

See application file for complete search history.

(56) References Cited

U.S. PATENT DOCUMENTS

| 1,962,168 A | * | 6/1934 | Orrin ........................ 340/605 |
| 4,077,261 A | * | 3/1978 | Ring et al. ..................... 73/706 |
| 4,468,613 A | | 8/1984 | Slough et al. |

(Continued)

FOREIGN PATENT DOCUMENTS

EP  0 838 672 A1  4/1998

*Primary Examiner*—Hezron Williams
*Assistant Examiner*—David A. Rogers
(74) *Attorney, Agent, or Firm*—Bacon & Thomas

(57) ABSTRACT

A pressure transmitter for transfer of a pressure prevailing in a first medium onto a second medium, including a pressure chamber 4 in a platform 1, which chamber is separated from the first medium by means of a dividing membrane 2, wherein the pressure can be transferred by means of the second medium to a pressure measurement cell. For timely recognition of an impending failure of the dividing membrane, an early warning detector is provided with a sensor chamber 6 having an opening, which faces the first medium; and a sensor 7, which monitors a property of a medium container in the sensor chamber; and a barrier facing the first medium, pressure-tightly sealing the opening, and which, under contact with the first medium and equal conditions as experienced by the dividing membrane 2, fails earlier than the dividing membrane, thus making possible a flow connection between the sensor chamber 6 and the first medium. Preferably, the barrier is in the form of a sacrificial membrane 5, which is thinner than the dividing membrane. In this way, it is to be expected that, under corrosive destruction of the membranes, the sacrificial membrane 5 will be destroyed earlier than the dividing membrane 2.

21 Claims, 2 Drawing Sheets

U.S. PATENT DOCUMENTS

| | | | |
|---|---|---|---|
| 4,970,898 A * | 11/1990 | Walish et al. | 73/706 |
| 5,524,492 A * | 6/1996 | Frick et al. | 73/706 |
| 5,760,310 A * | 6/1998 | Rud et al. | 73/706 |
| 5,983,726 A * | 11/1999 | Heller | 73/706 |
| 6,131,443 A | 10/2000 | Duncan | |
| 6,422,088 B1 * | 7/2002 | Oba et al. | 73/754 |
| 6,484,585 B1 * | 11/2002 | Sittler et al. | 73/718 |
| 6,705,169 B1 * | 3/2004 | Textor | 73/715 |
| 6,715,359 B1 * | 4/2004 | Lokhorst et al. | 73/745 |

* cited by examiner

PRESSURE SENSOR WITH BARRIER PROVIDING IMPENDING SENSOR FAILURE INDICATION

FIELD OF THE INVENTION

The invention relates to a device for transferring a pressure from a pressure prevailing in a first medium onto a second medium.

More specifically, the invention relates to devices having: a platform; a dividing membrane, which is secured at its edge onto the platform, wherein a first surface of the dividing membrane, facing away from the platform, can be brought into contact with the first medium, and a second surface of the dividing membrane, facing toward the platform, forms with the platform a pressure chamber, which can be filled with the second medium; and a sensor for ascertaining a rupture of the membrane.

BACKGROUND OF THE INVENTION

Devices of this type are, in addition to other uses, used for pressure measurement in aggressive media. The dividing membrane is contacted with an aggressive first medium and the pressure prevailing in the first medium is transferred to a second medium in the pressure chamber. There, the pressure is conducted either immediately, or over a suitable pressure conducting line, to a pressure measurement cell.

An incompressible hydraulic liquid, especially a hydraulic oil, is preferably used as the second medium for pressure transmission. In so far as such a substance is suited for contaminating a medium being measured, it is necessary to recognize early that there is a leak in the dividing membrane, or a rupture of the dividing membrane. To this end, Bastiaan discloses in the European patent application EP 0 838 672 a pressure transmitter, in which the pressure chamber has in its wall a dead-end hole, in which the electrode of a conductivity sensor is arranged. In such case, when the dividing membrane breaks, the first medium diffuses into the pressure chamber and into the dead-end hole, whereupon a change in the conductivity is detectable, provided that the first medium has a conductivity which deviates significantly from that of the second medium. This is especially the case, when the first medium is an aqueous medium and the second medium is a hydraulic oil, especially a silicone-based oil.

The described device has, however, the disadvantage that it ascertains a failure of the device only after the membrane rupture has already occurred and without having given any anticipatory warning that an exchange of the sensor was necessary. This behavior frequently leads to unacceptable down times for the installation. In order to prevent this, these pressure transmitters have to be exchanged on a precautionary basis during routine maintenance after a theoretical maximum lifetime, with corresponding factor of safety, has been reached. This can, however, lead in many instances to a premature exchange of the device, when actual membrane corrosion has not yet been so extensive that an exchange after the mentioned time is really needed.

SUMMARY OF THE INVENTION

It is, consequently, an object of the present invention to provide an improved device, which enables early recognition of an impending membrane rupture.

The device of the invention for transfer of a pressure from a pressure prevailing in a first medium onto a second medium comprises: a platform; a first dividing membrane, which is secured at its edge onto the platform, wherein a first surface of the dividing membrane, facing away from the platform, can be brought into contact with the first medium, and a second surface of the dividing membrane, facing the platform, forms with the platform a pressure chamber, which can be filled with the second medium, through which the pressure can be transferred to a pressure measurement cell; and an early warning detector with a sensor chamber having an opening facing the first medium; a sensor, which monitors a property of a medium contained in the sensor chamber; and facing the first medium, a barrier, which pressure-tightly seals the opening and which, under contact with the first medium and equal conditions as experienced by the dividing membrane, fails earlier than the dividing membrane, thus making possible a flow connection between the sensor chamber and the first medium.

The barrier is preferably in the form of a sacrificial membrane.

Preferably, the sacrificial membrane is thinner than the dividing membrane and is made of the same material. In this way, it is to be expected that, in the case of corrosive destruction of the membranes, the sacrificial membrane will be destroyed earlier than the dividing membrane.

Considering that the connection between a metallic membrane and a metallic platform often corrodes faster than the membrane itself, this being especially the case for welded connections, the controlled, faster failure of the barrier can also be achieved, for example, by securing the sacrificial membrane around the border of the sensor chamber opening with a weld seam which is thinner than the weld seam with which the dividing membrane is secured on the platform.

Finally, suitable choice of material can be used to assure that, for equal material thickness, a sacrificial membrane fails faster in a certain first medium than the dividing membrane. To this end, for example, an alloy can be used for the sacrificial membrane, which alloy is slightly changed relative to that of the dividing membrane.

Of course, it is recognized that the above-named measures for controlling the life span of the sacrificial membrane in relation to the life span of the dividing membrane can be combined with one another in any number of ways.

The relative life spans should be coordinated with respect to one another such that, following failure of the barrier, a reliable prognosis concerning the remaining life span of the dividing membrane is possible. To this end, the life span of the barrier should amount to between 70% and 99%, preferably between 80% and 98%, and especially between 85% and 95% of the life span of the dividing membrane for a particular first medium. In this connection, the range of variation in the life span relationships should be as small as possible, in order to enable a prognosis which is as accurate as possible.

The sensor chamber should preferably be filled with the same medium as the pressure chamber. However, the sensor chamber can also be evacuated, whereby a faster intrusion of the first medium into the sensor chamber is obtained, following failure of the sacrificial membrane.

The device of the invention assures that an approaching downtime caused by a failure of the first dividing membrane can be detected in time, so that the exchange of the device can occur in advance, without having to experience an unexpected stoppage of the installation in which the device is being used.

Preferably, the sensor is a conductivity sensor, which monitors the conductivity of a medium in the sensor chamber. Additionally, the sensor can be a capacitive sensor, which reports the relative dielectric constant of the medium.

Following the happening of a leak in the dividing membrane, the material properties of the second medium changes due to contaminants from the first medium. In so far as the contaminants spread essentially diffusively without a pressure gradient, the sensor should preferably be spaced at a maximum so far from the dividing membrane, that the expected diffusion time of the contaminants from a leak in the barrier, or sacrificial membrane, to the sensor does not exceed a given time span. In order to be able to apply the device of the invention as universally as possible, the sensor element should be arranged with the smallest possible separation from the dividing membrane. For accelerating detection of a contaminant, the sensor chamber can be filled with the second medium at a pressure that lies below the nominal pressure range for which the device is designed. Under these conditions, a pressure gradient is to be expected between the first medium and the sensor chamber during measurement operation.

When the sensor is a conductivity sensor, it includes at least two mutually separated electrodes, and the space between the electrodes is filled with an exchange medium, especially the second medium. The sensor can, for example, exhibit a first and a second electrode, which are each electrically insulated from one another and from the sensor chamber, or the sensor can exhibit a first electrode, which is insulated from the sensor chamber, wherein the sensor chamber serves as the counter electrode. A capacitive sensor can exhibit the same arrangement of the electrodes as a conductivity sensor.

BRIEF DESCRIPTION OF THE DRAWINGS

The invention will now be explained in more detail on the basis of the drawings, which show as follows.

DESCRIPTION OF THE PREFERRED EMBODIMENT

Figure 1:
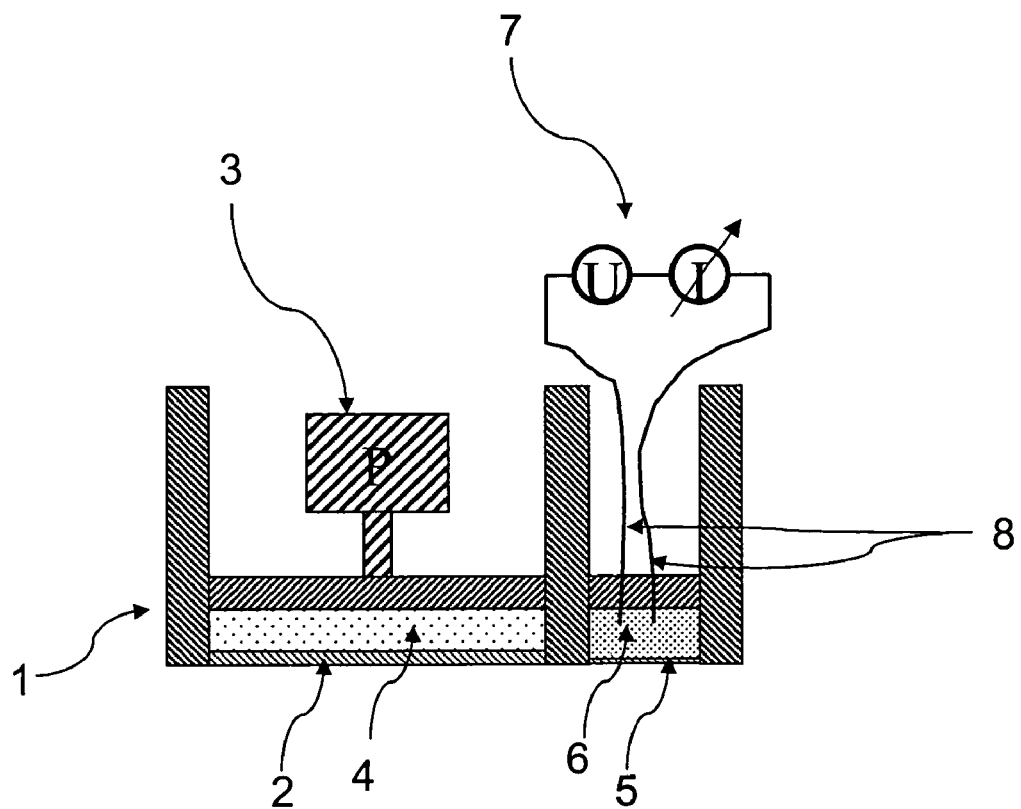
FIG. 1: A schematic drawing of a first embodiment of a device of the invention.

The pressure sensor shown in FIG. 1 includes a platform 1. A dividing membrane 2 is secured at its edge onto the front side of the platform, so that a pressure chamber 4 is formed between the dividing membrane 2 and the platform. In use, the dividing membrane is contacted on its side facing away from the pressure chamber with a first medium. The pressure chamber is filled with a second medium, the transfer medium, which preferably is a silicone oil. The transfer medium transmits the pressure to a pressure measurement cell 3, which produces a pressure-dependent measurement signal using any one of various methods known to those skilled in the art. This can occur, for example, capacitively, piezoresistively, inductively, or by a resonator method.

In the front side of the platform 1 next to the dividing membrane, a sacrificial membrane 5 is arranged, which preferably is made of the same material as the dividing membrane 2. The sacrificial membrane 5 is merely thinner than the dividing membrane 2, so that an earlier membrane rupture due to corrosion is to be expected.

The sacrificial membrane separates the sensor chamber 6 from the first medium. Electrodes 8 of the conductivity sensor 7 are arranged in the sensor chamber. The sensor chamber is filled with an exchange medium, which is contaminated by the first medium following the membrane rupture. The exchange medium is preferably electrically non-conductive and is, furthermore, preferably chemically essentially identical with the transfer liquid. By intrusion of contaminants from an aqueous first medium, the conductivity of the contents of the sensor chamber changes, so that a different resistance is measured between the electrodes 8 of the conductivity sensor 7. The change in the conductivity signals the failure of the sacrificial membrane, and from this a remaining life expectancy for the dividing membrane can be determined.

Figure 2:
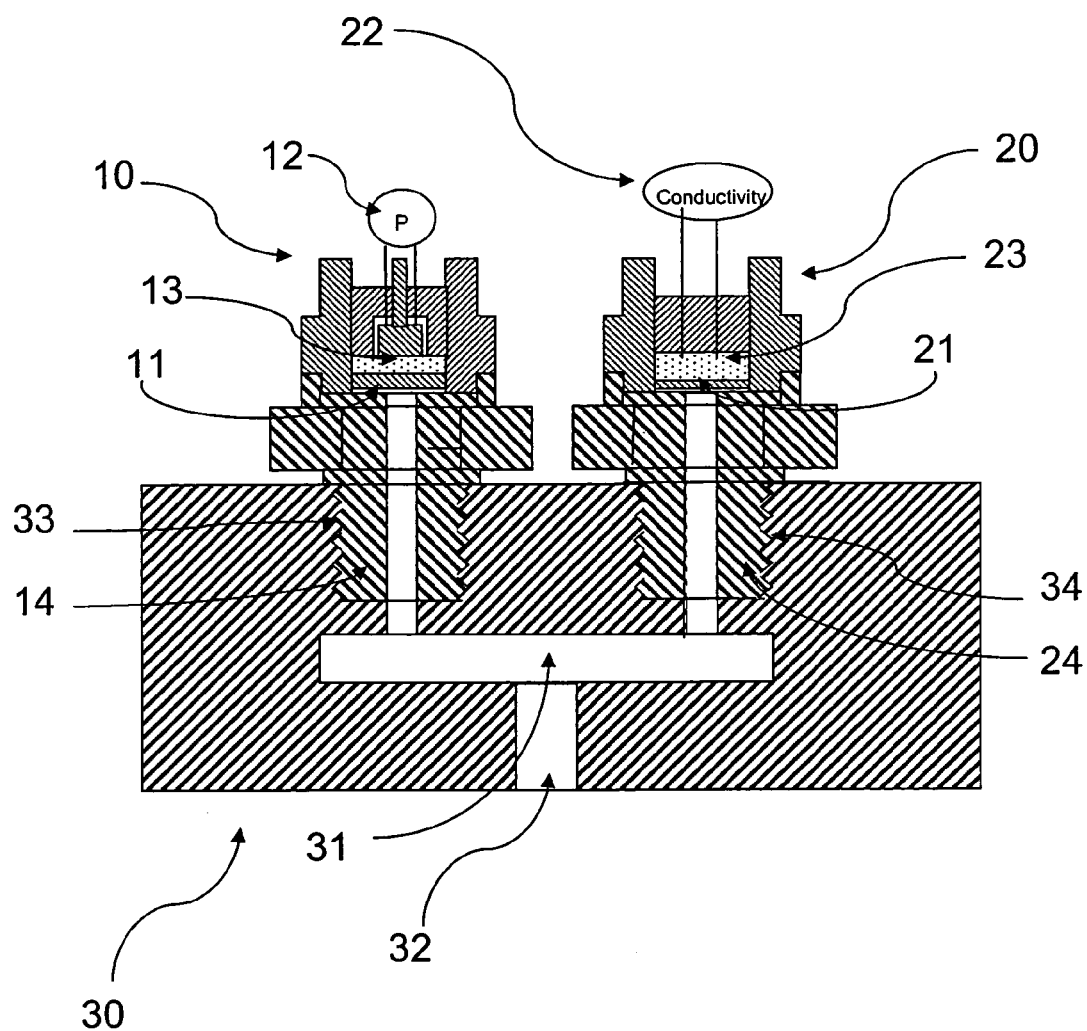
FIG. 2: A second embodiment of a device of the invention.

FIG. 2 shows another embodiment of the present invention, in which a conventional pressure sensor 10 is combined with a suitable early warning detector 20. Preferably, the early warning detector 20 has, regarding housing and process connection, an essentially identical construction as the pressure sensor 10, so that the sacrificial membrane 21 of the early warning detector 20 is arranged in an environment practically equivalent to the environment of a dividing membrane 11 of the pressure sensor 10. Moreover, the manufacturing expense is considerably reduced, since conventional components can be used.

The pressure sensor 10 and the early warning detector 20 each have a connection plug 14, 24, which is screwed into a complementary sensor socket 33, 34 of a distributor block 30. The two sensor sockets 33, 34, communicate with a distributor chamber 31, which is supplied from a pressure feed line 32 with the first medium. The connection plugs 14, 24 each have a canal, through which the first medium reaches the dividing membrane 11 and the sacrificial membrane 21, respectively.

As already explained, the sacrificial membrane 21 serves as a barrier between the first medium and a sensor chamber 23 arranged in the housing of the early warning detector 20. Sensor chamber 23 contains the electrodes of a conductivity sensor 22 which monitors the conductivity of the medium contained in the sensor chamber.

Regarding the controlling of the life expectancy of the sacrificial membrane 21 and the filling of the sensor chamber with an exchange medium, reference is made to the above discussions of these points.

Finally, according to the invention, an early warning detector, for example such as early warning detector 21, is provided as a retrofit device, which is usable as a supplement to a selected conventional pressure sensor, wherein the life span of the barrier, or sacrificial membrane, is matched to, i.e. is less than, the life span of the chosen pressure sensor, or its dividing membrane, for determined first media.

Although the invention has been explained on the basis of absolute pressure sensors, it can likewise be applied for relative pressure sensors and differential pressure sensors.

In the realm of applications for differential pressure sensors, it can occasionally be desirable additionally to know the absolute pressure. For these applications, an early warning detector of the invention can be used, which has a pressure measurement cell, which is loaded with the absolute pressure through the exchange medium contained in the sensor chamber.

LIST OF REFERENCE CHARACTERS

1 platform
2 dividing membrane
3 pressure measurement cell
4 pressure chamber
5 sacrificial membrane
6 sensor chamber
7 conductivity sensor
8 electrodes
10 pressure sensor 11 dividing membrane
12 pressure measurement cell
13 pressure chamber
14 connection plug
20 early warning detector
21 sacrificial membrane
22 conductivity sensor
23 sensor chamber
24 connection plug
30 distribution block
31 distribution chamber
32 first sensor socket
33 second sensor socket

The invention claimed is:

1. A device for transferring a pressure prevailing in a first medium onto a second medium, comprising:
 a platform;
 a dividing membrane, which is secured at its edge onto the platform, wherein a first surface of the dividing membrane, facing away from the platform, can be brought into contact with the first medium, and a second surface of the dividing membrane, facing toward the platform, forms with the platform a pressure chamber, which can be filled with the second medium, through which the pressure can be transferred to a pressure measurement cell; and
 an early warning detector with a sensor chamber having an opening facing the first medium; a sensor, which monitors a property of a medium contained in said sensor chamber; and a barrier, which pressure-tightly seals the opening and which has a surface which is in contact with the first medium, such that when equal conditions are experienced by said dividing membrane and said barrier, said barrier is designed to fail earlier than said dividing membrane, thus making possible a flow connection between said sensor chamber and the first medium, wherein:
 said sacrificial membrane and said dividing membrane are each secured with a weld seam, said weld seam of said sacrificial membrane, for a given first medium, is designed to fail earlier than said weld seam of said dividing membrane.

2. The device as claimed in claim 1, wherein said sensor is a conductivity sensor or a capacitive sensor.

3. The device as claimed in claim 1, wherein said barrier comprises a sacrificial membrane.

4. The device as claimed in claim 3, wherein said sacrificial membrane is thinner than said dividing membrane.

5. The device as claimed in claim 1 wherein said barrier is designed to have a life span of between 70% and 99% of the life span of said dividing membrane.

6. The device as claimed in claim 5 wherein said barrier life span is between 80% and 98% of the life span of said dividing membrane.

7. The device as claimed in claim 6 wherein said barrier life span is between 85% and 95% of the life span of said dividing membrane.

8. A device for transfer of a pressure prevailing in a first medium onto a second medium, comprising:
 a platform;
 a dividing membrane, which is secured at its edge onto the platform, wherein a first surface of the dividing membrane, facing away from the platform, can be brought into contact with the first medium, and a second surface of the dividing membrane, facing toward the platform, forms with the platform a pressure chamber, which can be filled with the second medium, through which the pressure can be transferred to a pressure measurement cell; and
 an early warning detector with a sensor chamber having an opening facing the first medium; a sensor, which monitors a property oaf medium contained in said sensor chamber; and a barrier, which pressure-tightly seals the opening and which has a surface which is in contact with the first medium, such that when equal conditions are experienced by said dividing membrane and said barrier, said barrier is designed to fail earlier than said dividing membrane, thus making possible a flow connection between said sensor chamber and the first medium, wherein:
 said barrier exhibits another material than said dividing membrane.

9. The device as claimed in claim 8, wherein said sensor is a conductivity sensor or a capacitive sensor.

10. The device as claimed in claim 8, wherein said barrier comprises a sacrificial membrane.

11. The device as claimed in claim 10, wherein said sacrificial membrane is thinner than said dividing membrane.

12. The device as claimed in claim 8 wherein said barrier is designed to have a life span of between 70% and 99% of the life span of said dividing membrane.

13. The device as claimed in claim 12 wherein said barrier life span is between 80% and 98% of the life span of said dividing membrane.

14. The device as claimed in claim 13 wherein said barrier life span is between 85% and 95% of the life span of said dividing membrane.

15. A device for transfer of a pressure prevailing in a first medium onto a second medium, comprising:
 a platform;
 a dividing membrane, which is secured at its edge onto the platform, wherein a first surface of the dividing membrane, facing away from the platform, can be brought into contact with the first medium, and a second surface of the dividing membrane, facing toward the platform, forms with the platform a pressure chamber, which can be filled with the second medium, through which the pressure can be transferred to a pressure measurement cell; and
 an early warning detector with a sensor chamber having an opening facing the first medium; a sensor, which monitors a property of a medium contained in said sensor chamber; and a barrier, which pressure-tightly seals the opening and which has a surface which is in contact with the first medium, such that when equal conditions are experienced by said dividing membrane and said barrier, said barrier is designed to fail earlier than said dividing membrane, thus making possible a flow connection between said sensor chamber and the first medium, wherein:
 said sensor chamber is evacuated.

16. The device as claimed in claim 15, wherein said sensor is a conductivity sensor or a capacitive sensor.

17. The device as claimed in claim 15, wherein said barrier comprises a sacrificial membrane.

18. The device as claimed in claim 17, wherein said sacrificial membrane is thinner than said dividing membrane.

19. The device as claimed in claim 15 wherein said barrier is designed to have a life span of between 70% and 99% of the life span of said dividing membrane.

20. The device as claimed in claim 19 wherein said barrier life span is between 80% and 98% of the life span of said dividing membrane.

21. The device as claimed in claim 20 wherein said barrier life span is between 85% and 95% of the life span of said dividing membrane.

* * * * *